United States Patent
Ash et al.

(10) Patent No.: US 11,687,888 B2
(45) Date of Patent: Jun. 27, 2023

(54) MANAGEMENT SYSTEM, MANAGEMENT METHOD, AND COMPUTER-READABLE RECORDING MEDIUM

(71) Applicant: NIPPON TELEGRAPH AND TELEPHONE CORPORATION, Tokyo (JP)

(72) Inventors: David Ash, Kirkland, WA (US); Shmuel Ur, Shorashim (IL); Vlad Dabija, Mountain View, CA (US)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/371,056

(22) Filed: Jul. 8, 2021

(65) Prior Publication Data

US 2023/0011785 A1      Jan. 12, 2023

(51) Int. Cl.
| G06Q 20/06 | (2012.01) |
| G06Q 20/40 | (2012.01) |
| G06Q 20/38 | (2012.01) |

(52) U.S. Cl.
CPC ..... *G06Q 20/0655* (2013.01); *G06Q 20/3825* (2013.01); *G06Q 20/3827* (2013.01); *G06Q 20/405* (2013.01)

(58) Field of Classification Search
None
See application file for complete search history.

(56) References Cited

U.S. PATENT DOCUMENTS

| 2016/0342983 | A1* | 11/2016 | Thomas | G06Q 20/027 |
| 2017/0300912 | A1* | 10/2017 | Narasimhan | G06Q 20/02 |
| 2019/0228409 | A1* | 7/2019 | Madisetti | G06Q 40/03 |
| 2019/0311353 | A1* | 10/2019 | Solis | G06F 21/64 |
| 2020/0184479 | A1* | 6/2020 | Benkreira | G06Q 20/0658 |
| 2022/0051218 | A1* | 2/2022 | Narasimhan | G06Q 20/065 |

OTHER PUBLICATIONS

"Amine Soufaih, Revolutionizing International Remittance Payments Using Cryptocurrency and Blockchain-based Technology, University of Pennsylvania, Sep. 1, 2020, 11-19" (Year: 2020).*
Moinet et al. (2017) "Blockchain based trust & authentication for decentralized sensor networks," arXiv:1706.01730v1 [cs.CR].
Wu et al. (2018) "An Out-of-band Authentication Scheme for Internet of Things Using Blockchain Technology," [online] website: https://www.researchgate.net/publication/321491493.

* cited by examiner

*Primary Examiner* — Kito R Robinson
*Assistant Examiner* — Toan Duc Bui

(57) ABSTRACT

A management system includes a user terminal, and a management device that manages data, wherein the management device include a memory; and a processor coupled to the memory and executes a process comprising: requesting remittance of a cryptocurrency that uses a public distributed ledger from the user terminal, upon receiving a request for accessing managed data from the user terminal, and authorizing the user terminal to access the data when a record of clearance of the remittance made by the user terminal is added to the public distributed ledger.

6 Claims, 4 Drawing Sheets

MANAGEMENT SYSTEM, MANAGEMENT METHOD, AND COMPUTER-READABLE RECORDING MEDIUM

BACKGROUND OF THE INVENTION

1. Field of the Invention

The present invention relates to a management system, a management method, and a computer-readable recording medium.

2. Description of the Related Art

The biggest threats by attackers are mostly in that an attacker can gain an access to confidential data once the attacker gains an access to a network, rather than that the attacker performs an unauthorized access to the network. Defense against such an access is partly possible by the use of a data access log, but it is also possible that the data access log itself becomes a target of an attack and tampered by the attacker.

Therefore, a method is required for not only blocking an unauthorized access to a network but also preventing an access to confidential data, in particular. Furthermore, because there are some users who are formally authorized to access a network but not allowed to access specific data on the network, it is necessary to protect data independently from the network. Related art examples are disclosed in Axel Moinet, Benoit Darties, and Jean-Luc Baril, Blockchain based trust & authentication for decentralized sensor networks, arXiv:1706.01730v1 [cs.CR] 6 Jun. 2017, and Longfei Wu, Xiaojiang Du, Wei Wang, Bin Lin, An Out-of-band Authentication Scheme for Internet of Things Using Blockchain Technology, https://www.researchgate.net/publication/321491493.

SUMMARY OF THE INVENTION

It is an object of the present invention to at least partially solve the problems in the conventional technology.

A management system includes a user terminal, and a management device that manages data, wherein the management device include a memory; and a processor coupled to the memory and executes a process comprising:

requesting remittance of a cryptocurrency that uses a public distributed ledger from the user terminal, upon receiving a request for accessing managed data from the user terminal, and authorizing the user terminal to access the data when a record of clearance of the remittance made by the user terminal is added to the public distributed ledger.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
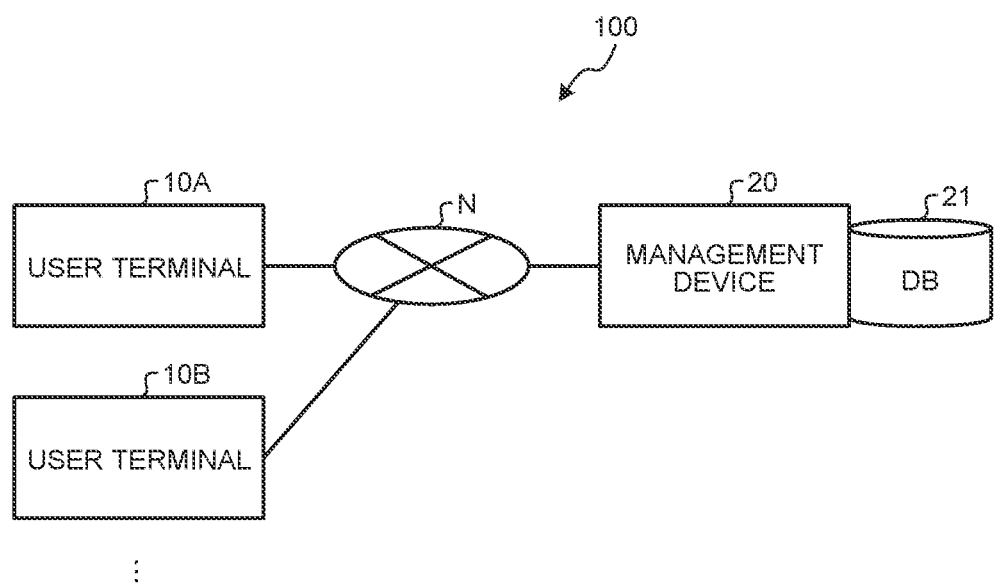
FIG. 1 is a diagram schematically illustrating one example of a management system according to an embodiment.

One embodiment of the present invention will now be explained in detail with reference to some drawings. This embodiment is, however, not intended to limit the scope of the present invention in any way. Furthermore, in the depictions of the drawings, the same parts are indicated in a manner appended with the same reference numerals.

Embodiment

In this embodiment, a method for authorizing an access to data and tracking the access using a blockchain and a cryptocurrency is disclosed. A user is associated with a specific cryptocurrency wallet that the user him/herself registers on the network, but does not provide a private key. When the user is to access a specific piece of data, the user receives a request to make a micropayment corresponding to an extremely small amount of money from his/her wallet. The amount of money is extremely small, but the monetary value does not count, and what counts is that a secure log of the data access can be created using a blockchain. Because only a specific user can access or remit money from his/her wallet, the wallet serves as additional information for confirming the identity of the user.

FIG. 1 is a diagram schematically illustrating one example of a management system according to the embodiment. As illustrated in FIG. 1, this management system 100 includes user terminals 10A and 10B, and a management device 20, for example. The user terminals 10A and 10B, and the management device 20 are connected to a network N over the wire or wirelessly. Examples of the network N include a local area network (LAN), a wide area network (WAN), a telephony network (such as a mobile telephone network and a public switched telephone network), a regional Internet Protocol (IP) network, and the Internet. The user terminals 10 and the management device 20 can communicate with each other over the network N.

The user terminals 10A and 10B are information processing devices used by users, for example. The user terminal 10 may be implemented as a smartphone, a tablet terminal, a laptop personal computer (PC), a desktop PC, a mobile telephone, or a personal digital assistant (PDA), for example.

The user terminals 10A and 10B are devices used by wallet owners. The user terminals 10A and 10B are given authorization to access data managed by the management device 20 by performing a predetermined cryptocurrency transaction specified by the management device 20 using the blockchain.

The configuration illustrated in FIG. 1 is merely one example, and the number of devices corresponding to the user terminals 10A and 10B is not limited to a particular number. Furthermore, in the description hereunder, the user terminals 10A and 10B will be collectively referred to and explained as a user terminal 10.

The management device 20 is a device that includes a databases (DB) 21 storing therein managed data, and that manages the data in the DB 21. The management device 20 can be implemented as a server, for example.

The management device 20 authorizes an access to the data recorded in the DB 21, and tracks the access based on the cryptocurrency transaction indicated in the blockchain. The management device 20 is a server operated by a network security administrator as well as a data administrator.

The user terminals 10 and the management device 20 both store therein a blockchain.

The cryptocurrency may be any desired cryptocurrency as long as the cryptocurrency is a virtual currency that uses a public distributed ledger such as the blockchain.

Figure 2:
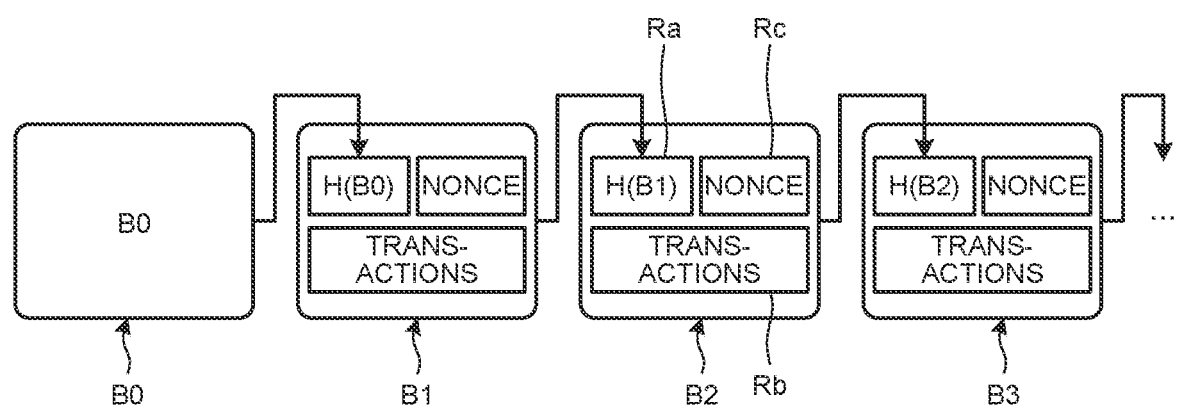
FIG. 2 is a diagram for explaining one example of a configuration of a blockchain.

FIG. 2 is a diagram for explaining one example of a configuration of the blockchain.

As illustrated in FIG. 2, the blockchain has a configuration including a chronological concatenation of blocks B0 to B3, for example. The block B0 is a top block, and the blocks B1 to B3 are units of transactions each representing transaction information related to the cryptocurrency.

For example, in the block B2, an area Ra contains a hash (H(B1)) of the block B1, which is a block immediately before the block B2; an area Rb contains a plurality of transactions performed with a cryptographic technology; and an area Rc contains nonce. A hash is a result of conversion in which a value of any desired piece of data is converted into a value having a constant short length, by an execution of a hash function.

Nonce is a key for turning the hash (H(B2)) for the next block B3 into a value that satisfies a specified condition, for example, and is a value having a constant length. For example, nonce is a key for turning the hash used in the block B3 into a "value including a certain number of successive zeros".

To enhance security, this piece of blockchain data needs to be subjected to seeding using some kind of method. Seeding is performed through a secure meeting that takes place only once when a cryptocurrency wallet is set up for a user, or through a series of some operations a user is requested to perform (e.g., a series of mouse click operations that are different from ordinary ones). This seeding is then encoded into the blockchain so as not to be modified from that time on.

Before transmitting a cryptocurrency, the user terminal 10 generates a transaction related to this transaction of the money, and transmits the transaction to another device in the management system 100. The transaction is cleared when the transmitted transaction is approved through mining by another device, and is connected to the blockchain.

Figure 3:
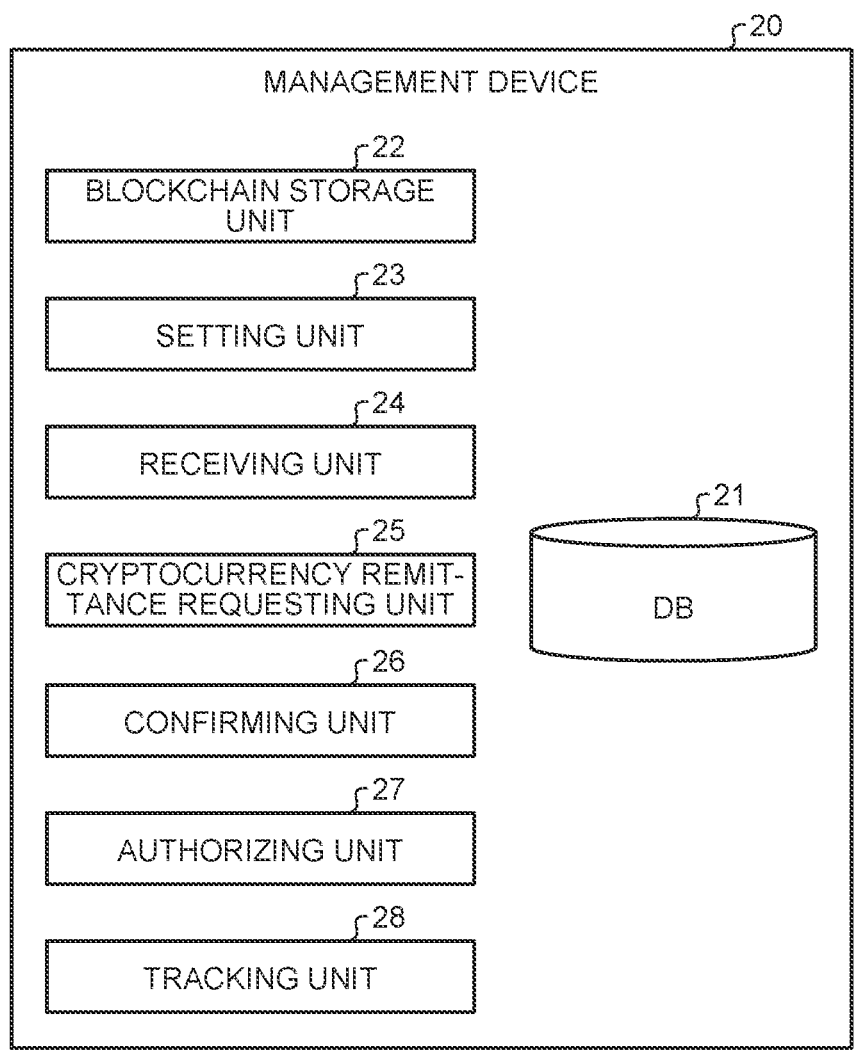
FIG. 3 is a diagram schematically illustrating one example of a configuration of the management device illustrated in FIG. 1.

FIG. 3 is a diagram schematically illustrating one example of a configuration of the management device 20 illustrated in FIG. 1.

The management device 20 is implemented by causing a predetermined computer program to be read onto a computer or the like including a read-only memory (ROM), a random access memory (RAM), and a central processing unit (CPU), and causing the CPU to execute the predetermined computer program. The management device 20 also includes a communication interface for transmitting and receiving various types of information to and from another device connected over a network, for example. For example, the management device 20 includes a network interface card (NIC) or the like, and communicates with another device over an electric communication circuit such as a local area network (LAN) or the Internet.

The management device 20 includes the DB 21 storing therein managed data, a blockchain storage unit 22, a setting unit 23, a receiving unit 24, a cryptocurrency remittance requesting unit 25, a confirming unit 26, an authorizing unit 27, and a tracking unit 28.

The blockchain storage unit 22 stores therein a blockchain. The blockchain storage unit 22 stores therein a blockchain for each type of cryptocurrency.

The setting unit 23 sets a type of cryptocurrency correspondingly to each of the user terminals 10. The same type of cryptocurrency may be set for the user terminal 10A and the user terminal 10B, or different types of cryptocurrency may be set, for example.

The receiving unit 24 receives a request for accessing managed data in the DB 21 from the user terminal 10.

Once the receiving unit 24 receives a request for accessing data from the user terminal 10, the cryptocurrency remittance requesting unit 25 requests remittance of a cryptocurrency using the blockchain, from the user terminal 10 that is the requestor.

The confirming unit 26 determines whether the money has been remitted by the requestor user terminal 10. The confirming unit 26 confirms whether a record of the clearance of the cryptocurrency remittance performed by the requestor user terminal 10 has been added to the blockchain.

The authorizing unit 27 authorizes the user terminal 10 that is the requestor to access data stored in the DB 21, when the requestor user terminal 10 has remitted the money. When no money has been remitted by the requestor user terminal 10, the authorizing unit 27 prohibits the requestor user terminal 10 from making the access.

The tracking unit 28 keeps track of the data access, by referring to the blockchain.

Figure 4:
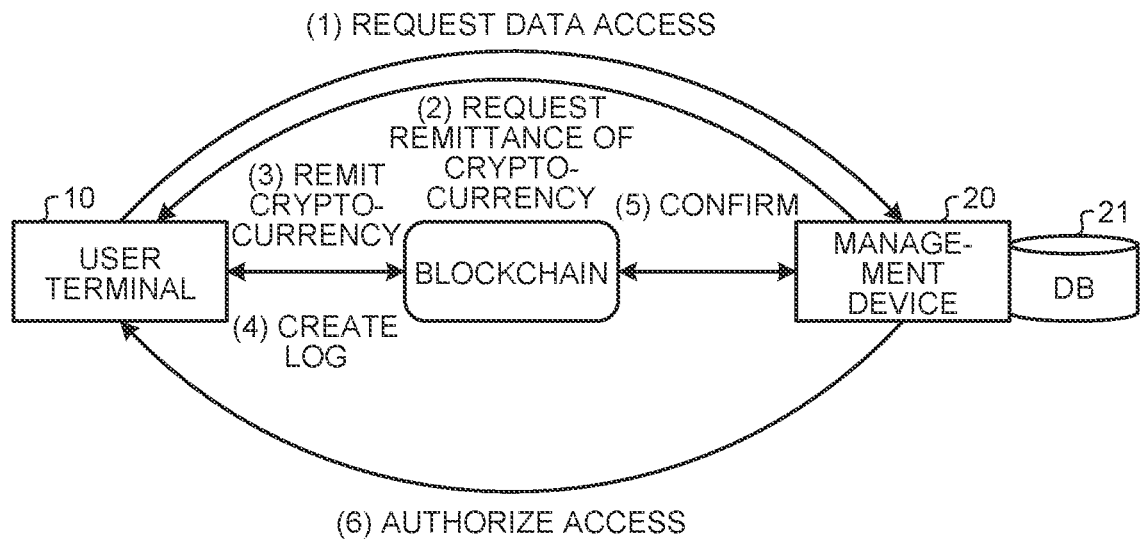
FIG. 4 is a diagram illustrating a sequence of a process in the management system illustrated in FIG. 1.

FIG. 4 is a diagram illustrating the sequence of a process performed in the management system 100 illustrated in FIG. 1.

In the management system 100, upon receiving a request for a data access from the user terminal 10 ((1) in FIG. 4), the management device 20 requests remittance of a cryptocurrency from the requestor user terminal 10 ((2) in FIG. 4). When the user wishes to access data in the DB 21 on the network (particularly confidential data), the user is always requested to make a micropayment.

Once the user terminal 10 makes the payment and remits the cryptocurrency ((3) in FIG. 4), the user terminal 10 is authenticated. A transaction log is then created ((4) in FIG. 4), and a block containing this transaction is added to the blockchain.

The management device 20 then confirms whether the money has been remitted from the requestor user terminal 10 by referring to the blockchain ((5) in FIG. 4).

If the money has been remitted from the requestor user terminal 10, the management device 20 authorizes the requestor user terminal 10 to access the data stored in the DB 21 ((6) in FIG. 4). If no money has been remitted by the requestor user terminal 10, the management device 20 prohibits the requestor user terminal 10 from making the access.

Figure 5:
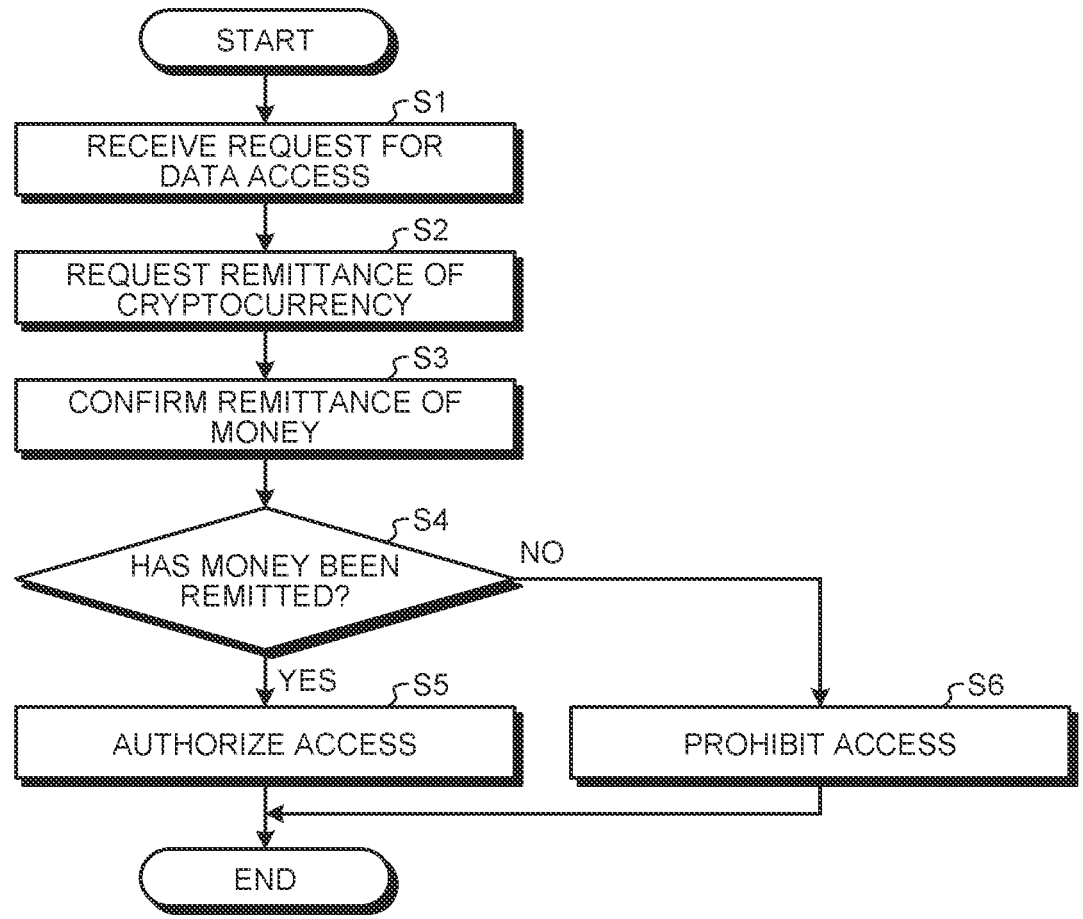
FIG. 5 is a diagram illustrating a process procedure of a process executed by the management device illustrated in FIG. 1.

FIG. 5 is a diagram illustrating a process procedure of a process performed by the management device 20 illustrated in FIG. 1. The management device 20 receives a request for accessing managed data in the DB 21 from the user terminal 10 (Step S1). The management device 20 then requests remittance of a cryptocurrency using the blockchain from the requestor user terminal 10 (Step S2).

The management device 20 then confirms whether the money has been remitted from the requestor user terminal 10, by referring to the blockchain (Step S3).

If the money has been remitted from the requestor user terminal 10 (Yes at Step S4), the management device 20 authorizes the requestor user terminal 10 to access the data stored in the DB 21 (Step S5).

If no money has been remitted by the requestor user terminal 10 (No at Step S4), the management device 20 prohibits the requestor user terminal 10 from making the access (Step S6).

A blockchain transaction is a record made public among the wallet owners. In the embodiment, by allowing the wallet owner and the network security administrator to confirm when the wallet is used for making a data access by referring to the blockchain transaction, it is possible to identify the time at which unauthorized operation is performed, and thereby to enhance the security.

In the embodiment, the network security administrator can set up a specific cryptocurrency wallet for a specific user, and to authorize an access to specific data, instead of granting a universal access to the entire data, via the management device 20.

With the management method according to the embodiment, a highly secure data access authentication method can be implemented. The management method according to the embodiment also ensures the integrity of the log of data accesses on the network against hacking attempts.

The management method according to the embodiment also has a psychological security effect. Because there are many computer applications for which a user is required to keep access authentication information (a username and a password), there are chances that passwords fail to be protected sufficiently in daily life, such as by letting a third person to access a password, using the same password in different places, or using an incorrect password. By contrast, many people tend to handle their own wallets carefully, and be cautious in such a manner that no one else can access the wallet.

Therefore, by using a mechanism of a cryptocurrency payment that uses a blockchain for an access to the network and to the data on the DB 21, the level of the security added to the authentication information is improved.

In the embodiment, either one of a private cryptocurrency and a public cryptocurrency may be used. It is preferable for the cryptocurrency used in the embodiment to be a cryptocurrency that enables a transaction to be performed relatively quickly. For example, it is possible to use a known cryptocurrency such as Ethereum that enables remittance of a small amount of money, and enables transactions to be performed quicker than with Bitcoin. Currently, the smallest unit of Ethereum is wei (the current value is less than $10^{-13}$ US cent).

The network security administrator may create a unique internal cryptocurrency that the users can use in the transactions, for private computer network or data. It is preferable for such an internal cryptocurrency to be a cryptocurrency that enables the transactions to be performed relatively quickly, and that enables micropayment.

The management method according to the embodiment establishes a payment with a cryptocurrency using a blockchain as a condition for accessing data. The management method according to the embodiment can prevent an unauthorized access to specific data.

Because the management method according to the embodiment establishes a payment with a cryptocurrency using a blockchain as a condition for accessing data, it is possible to create a secure log with a clear record of the time of the data access. This is convenient in confirming whether someone has made an unauthorized access to the data.

With the management method according to the embodiment, it is possible to identify when a suspectedly unauthorized operation is performed based on the pattern of the data accesses, rather than based on one data point that is being accessed. Furthermore, because the management method according to the embodiment uses a payment with the cryptocurrency using a blockchain as a condition for accessing data, the management method can be carried out easily.

Conventionally, research has been carried out in the field of the device authentication using a blockchain technology over a wide area network, but these types of research are all intended for authentications of sensors and other Internet-of-Things (IoT) devices on the wide area network. In such a case, cryptocurrency transactions are not used because there is no human interventions. In such conventional research, a blockchain technology is used only for authenticating a trusted IoT device on the network.

By contrast, the management method according to the embodiment can be applied, through the use of cryptocurrency transaction data, to a human intruder who attempts to access confidential data by hacking the network, and to eliminate the trace by tampering the data access log.

System Configurations

The illustrated components of the devices are functionally conceptual, and need not be physically configured as illustrated. In other words, the specific modes of distribution and integration of the devices are not limited to those illustrated in the drawings, and all or a part thereof can be functionally or physically distributed or integrated in any desired units according to various kinds of load and conditions of use. All or a certain part of the processing functions performed by the devices may be implemented by a CPU and a computer program analyzed and executed by the CPU or may be implemented as hardware using wired logic.

All the automatic processes explained in the present embodiment can be, entirely or partially, carried out manually. Similarly, all the manual processes explained in the present embodiment can be, entirely or partially, carried out automatically by a known method. The processing procedures, the control procedures, specific names, information including various types of data and parameters mentioned in the description and drawings above can be optionally changed unless otherwise specified.

Computer Program

Figure 6:
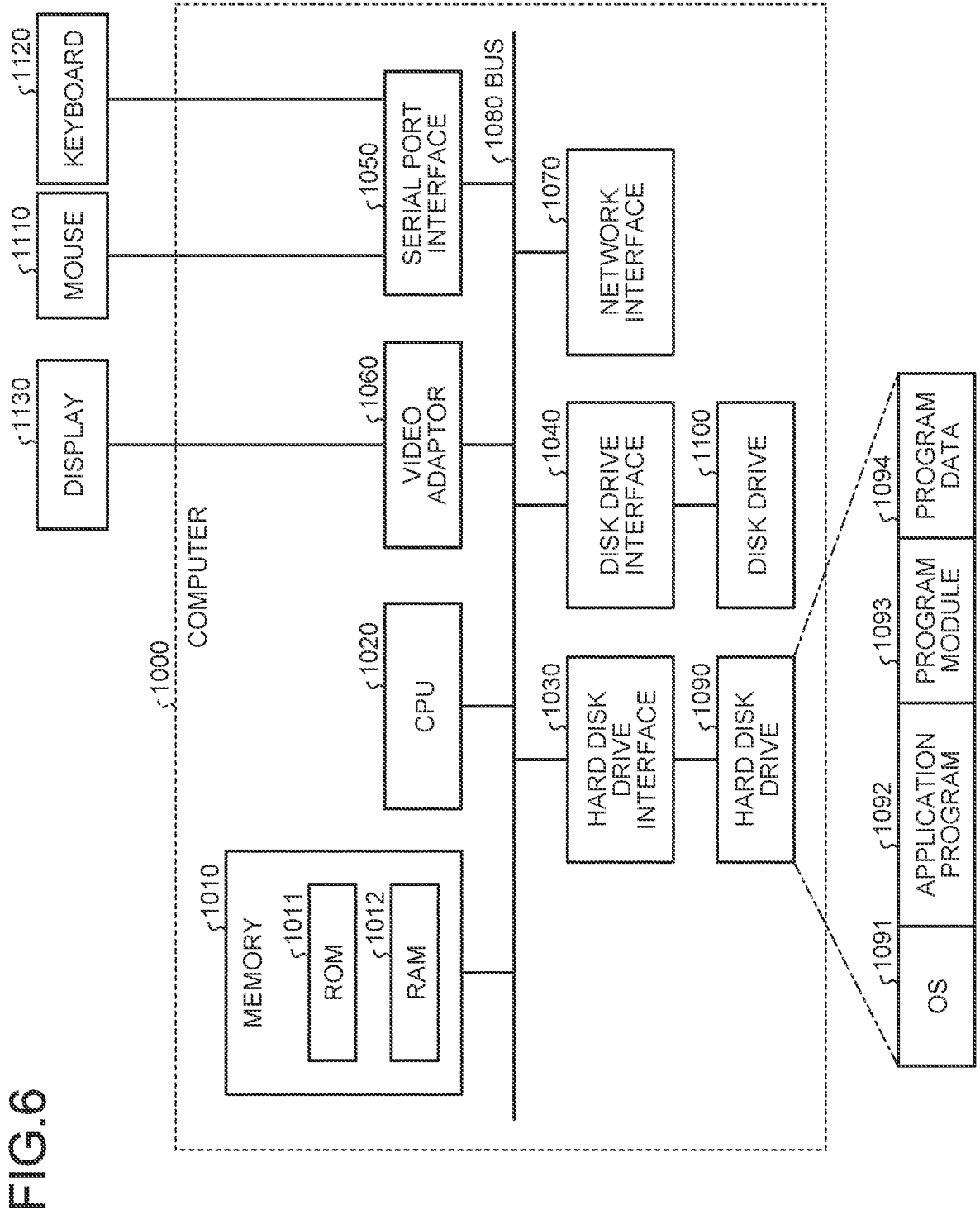
FIG. 6 is a diagram illustrating one example of a computer on which a user device or a management device are implemented by execution of a computer program.

FIG. 6 is a diagram illustrating an example computer implementing the user terminal 10, and the management device 20 by executing a computer program. A computer 1000 includes, for example, a memory 1010 and a CPU 1020. The computer 1000 also includes a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores therein, for example, a boot program such as basic input/output system (BIOS). The hard disk drive interface 1030 is connected to a hard disk drive 1090. The disc drive interface 1040 is connected to a disc drive 1100. To the disc drive 1100, for example, a removable storage medium such as a magnetic disc or an optical disc is inserted. The serial port interface 1050 is connected to, for example, a mouse 1110 and a keyboard 1120. The video adapter 1060 is connected to, for example, a display 1130.

The hard disk drive 1090 stores therein, for example, an operating system (OS) 1091, an application program 1092, a program module 1093, and program data 1094. In other words, the computer program defining the processes of the user terminal 10, and the management device 20 is installed as the program module 1093 in which a computer-executable code is described. The program module 1093 is stored in, for example, the hard disk drive 1090. The hard disk drive 1090 stores therein, for example, the program module 1093 that executes the same processing as that of the functional configuration of the user terminal 10, and the management device 20. The hard disk drive 1090 may be substituted by a solid-state drive (SSD).

The setup data for use in the processing of the embodiment above is stored in, for example, the memory 1010 or the hard disk drive 1090 as the program data 1094. The CPU 1020 reads, as necessary, the program module 1093 and the program data 1094 stored in the memory 1010 or the hard disk drive 1090 onto the RAM 1012 and executes them.

The program module 1093 and the program data 1094 are not necessarily stored in the hard disk drive 1090, but may be stored in, for example, a removable storage medium and may be read by the CPU 1020 via, for example, the disc drive 1100. Alternatively, the program module 1093 and the program data 1094 may be stored in another computer connected via a network such as a local area network (LAN) or a wide area network (WAN). The program module 1093 and the program data 1094 may be read by the CPU 1020 from the other computer via the network interface 1070.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system for securely accessing data from a user terminal operated by a user using a blockchain as a secure data access log, the system comprising:
   a memory; and
   a processor coupled to the memory storing computer-executable instructions that when executed by the processor cause the system to execute a method comprising:
      setting up a set of cryptocurrency data associated with the user terminal operated by the user and further associated with authorizing a secure access to the data, wherein the set of cryptocurrency data uses a public distributed ledger as the blockchain including transaction log data, wherein the public distributed ledger includes a concatenation of a plurality of data records as blocks of data, and wherein one or more data records of the plurality of data records indicate remittance information based on cryptocurrency;
      receiving, by a data management server, a request from the user terminal for access to the data over a network;
      in response to receiving the request, transmitting, by the data management server to the user terminal, an instruction including a request for remittance of a piece of cryptocurrency data from the set of cryptocurrency data associated with the user terminal;
      identifying, by the data management server, a data record added to the plurality of data records in the public distributed ledger, wherein the added data record indicates the remittance of the piece of cryptocurrency data by the user terminal, wherein remittance includes the authentication of the user terminal, and wherein the added data record includes a timestamp of completing the remittance; and
      causing, by the data management server based on the identifying the added data record indicating the remittance in the public distributed ledger, the user terminal to access the data as requested by the user terminal, wherein the public distributed ledger represents the secure data access log data including a record of authorizing the secure access to the data according to the transaction log data, and wherein the timestamp of completing the remittance corresponds to a time of authorizing the user terminal to access the data.

2. The management system according to claim 1, the computer-executable instructions when executed further execute a method comprising:
   setting a type of the set of the cryptocurrency data associated with the user terminal.

3. The management system according to claim 1, the computer-executable instructions when executed further execute a method comprising:
   authorizing the user terminal an access to the data based on the added data record in the public distributed ledger.

4. The management system according to claim 1, wherein the public distributed ledger includes the blockchain further comprising a chronological concatenation of a plurality of the blocks of data, at least one of the plurality of blocks representing a record of remittance of the piece of cryptocurrency data.

5. A management method executed by a management system, the method comprising:
   setting up a set of cryptocurrency data associated with the user terminal operated by the user and further associated with authorizing a secure access to the data, wherein the set of cryptocurrency data includes a public distributed ledger as the blockchain including transaction log data, wherein the public distributed ledger includes a concatenation of a plurality of data records as blocks of data, and wherein one or more data records of the plurality of data records indicates remittance information based on cryptocurrency;
   receiving, by a data management server, a request from the user terminal for accessing the data over a network;
   in response to receiving the request, transmitting, by the data management server to the user terminal, an instruction including a request for remittance of a piece of cryptocurrency data from the set of cryptocurrency data associated with the user terminal;
   identifying, by the data management server, a data record added to the plurality of data records in the public distributed ledger, wherein the added data record indicates the remittance of the piece of the cryptocurrency data by the user terminal, wherein remittance includes the authentication of the user terminal, and wherein the added data record includes a timestamp of completing the remittance; and
   causing, by the data management server based on the identifying the added data record indicating the remittance of the public distributed ledger, the user terminal to access the data as requested by the user terminal, wherein the public distributed ledger represents the secure data access log data including a record of authorizing the secure access to the data according to the transaction log data, and wherein the timestamp of completing the remittance corresponds to a time of authorizing the user terminal to access the data.

6. A management device comprising a processor configured to execute a method comprising:

setting up a set of cryptocurrency data associated with the user terminal operated by the user and further associated with authorizing a secure access to the data, wherein the set of cryptocurrency data uses a public distributed ledger as the blockchain including transaction log data, wherein the public distributed ledger includes a concatenation of a plurality of data records as blocks of data, and wherein one or more data records of the plurality of data records indicates remittance information based on cryptocurrency;

receiving, by a data management server, a request from the user terminal for accessing the data over a network;

in response to receiving the request, transmitting, by the data management server to the user terminal, an instruction including a request for remittance of a piece of cryptocurrency data from the set of cryptocurrency data associated with the user terminal;

identifying, by the data management server, a data record added to the plurality of data records in the public distributed ledger, wherein the added data record indicates the remittance of the piece of cryptocurrency data by the user terminal, wherein remittance includes the authentication of the user terminal, and wherein the added data record includes a timestamp of completing the remittance; and causing, by the data management server based on the identifying the added data record indicating the remittance in the public distributed ledger, the user terminal to access the data as requested by the user terminal, wherein the public distributed ledger represents the secure data access log data including a record of authorizing securely accessing the data according to the transaction log data, and wherein the timestamp of completing the remittance corresponds to a time of authorizing the user terminal to access the data.

* * * * *